(No Model.) 2 Sheets—Sheet 1.
W. H. BRISTOL.
PHOTOGRAPHIC CAMERA.

No. 478,780. Patented July 12, 1892.

WITNESSES:
Chas. H. Ternstedt
Joseph Elias

INVENTOR
William H. Bristol
BY A Faber du Faur.
ATTORNEY (No Model.) 2 Sheets—Sheet 2.
W. H. BRISTOL.
PHOTOGRAPHIC CAMERA.
No. 478,780. Patented July 12, 1892.
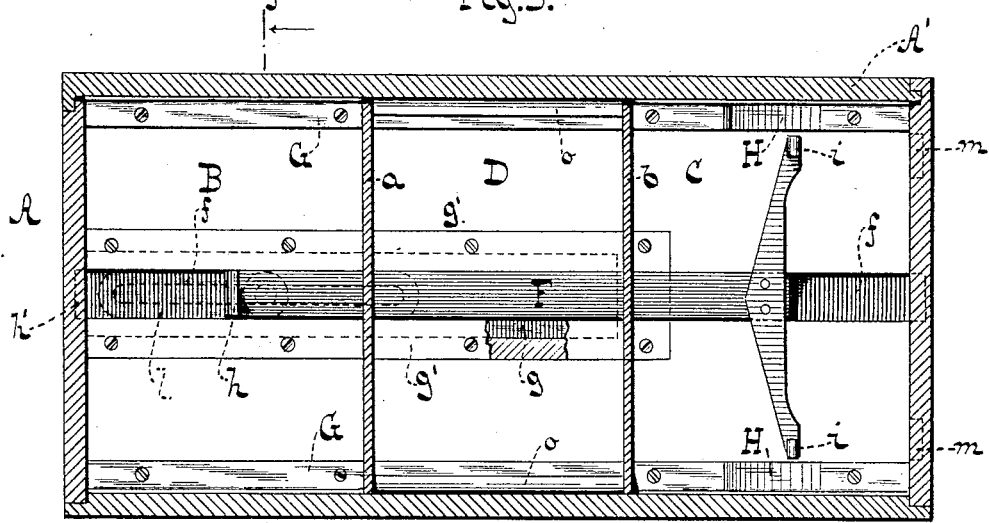
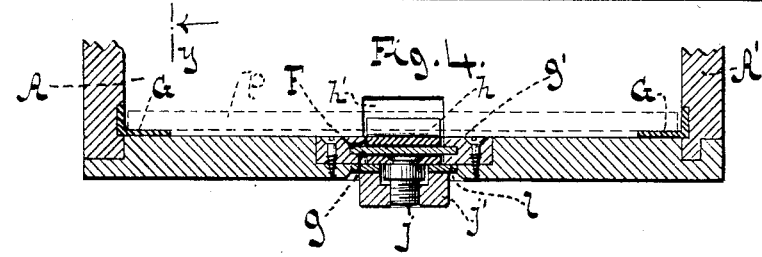
WITNESSES:
INVENTOR
William H. Bristol
BY
A. Faber du Faur Jr.
ATTORNEY

UNITED STATES PATENT OFFICE.

WILLIAM H. BRISTOL, OF HOBOKEN, NEW JERSEY.

PHOTOGRAPHIC CAMERA.

SPECIFICATION forming part of Letters Patent No. 478,780, dated July 12, 1892.

Application filed January 27, 1892. Serial No. 419,407. (No model.)

*To all whom it may concern:*

Be it known that I, WILLIAM H. BRISTOL, a citizen of the United States, and a resident of Hoboken, in the county of Hudson and State of New Jersey, have invented certain new and useful Improvements in Photographic Cameras, of which the following is a specification.

My invention has reference to three-compartment magazine-cameras, and has for its objects, first, to render the operation of transferring the plates or film-holders from the receiving-compartment to the exposing-compartment and from thence to the storage-compartment more reliable than heretofore; second, to permit of the plates being transferred regardless of the position in which the camera may be held, which cannot be done in a large variety of magazine-cameras depending partly on gravity for transferring the plates or changing the position of the same, and, finally, to have the plate or film-holder firmly held while in the exposing-compartment.

With these objects in view I provide a simple device which is novel in construction for shifting the plates from one compartment to the other and place in the storage-compartment, inclined surfaces which lift the plates or film-holders and co-operate with the shifting device in permitting the passage of the plates or film-holders into the storage-compartment, the whole construction being such that the plate or film-holder in the exposing-compartment is always locked between a part of the shifting device and the bottom plate or film-holder in one of the compartments, all of which is more fully pointed out in the following specification and claims, and illustrated in the accompanying drawings, in which—

Figure 1:
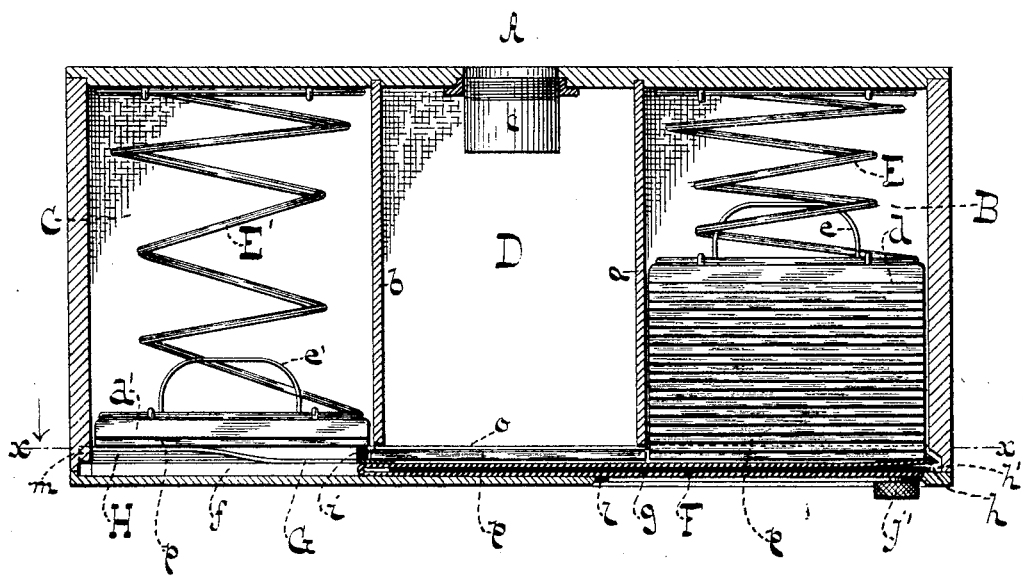
Figure 2:
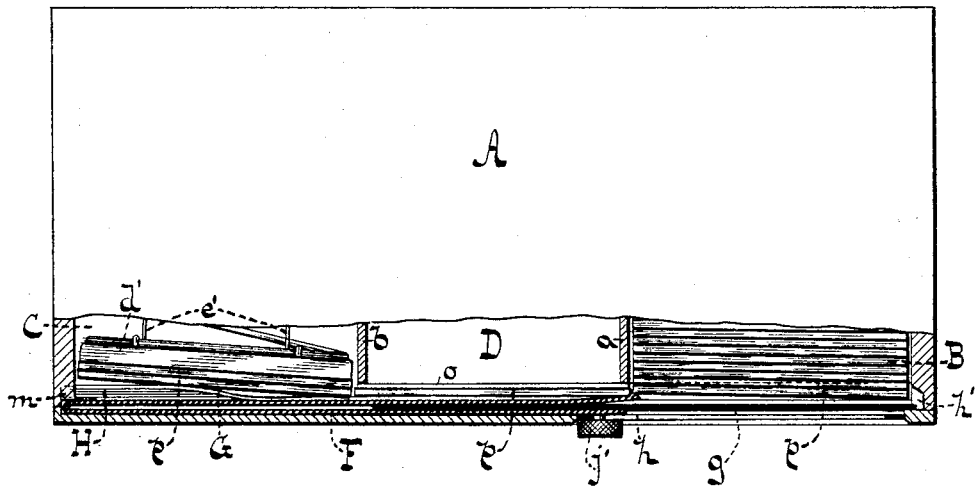

Figure 1 represents a central longitudinal section of a camera embodying my invention, the plates or film-holders being shown in elevation. Fig. 2 is a plan or top view, partly in section, and showing the shifting device in a different position. Fig. 3 is a longitudinal section in the plane $x\ x$, Fig. 1. Fig. 4 is a cross-section in the plane $y\ y$, Fig. 3.

Similar letters indicate corresponding parts throughout the several views.

In the drawings, the letter A designates the box or case, which may be of any proper material and appropriate design, and is provided with a removable cover A'. It is divided into three compartments by suitable partitions $a$ and $b$. One of these compartments B is intended to receive the unexposed plates and is formed by the partition $a$. Another compartment C is formed at the opposite end of the box or case by the partition $b$ for the storage of the exposed plates, while the intermediate space between the two partitions $a\ b$ forms the exposing-compartment D, the same being provided with the usual lens-tube $c$.

The unexposed plates or the film-holders in the receiving-compartment B are pressed against the back wall of the case by means of the spiral spring E, secured at its outer end to the front of the camera and at the opposite end to a follower $d$, bearing on the plates. The storage-compartment C is provided with a similar spring E' and follower $d'$, which yield as the plates or film-holders $p$ are successively delivered into the said compartment. In order to facilitate the insertion into and the removal of the plates or film-holders $p$ from the respective compartments, the followers are provided, respectively, with handles $e\ e'$, into which the fingers can be readily inserted for withdrawing the followers from the plates or film-holders.

In the rear wall of the camera is formed a groove $f$, extending the entire length of the same, and in this groove is located the shifting device, which consists of a sliding carrier F, by means of which the plates or film-holders $p$ are transferred from the receiving-compartment B to the exposing-compartment D and after exposure to the storage-compartment C. This carrier consists of a strip of brass or other resilient material bent back upon itself or formed of two connected pieces and extending across two of the compartments. The end of the strip, which is located within the receiving-compartment B, is provided with an inwardly-extending hook $h$ of sufficient prominence to engage a single plate or film-holder at a time. The opposite end of the strip is provided with a projection $i$, which is located so as to come just outside of the partition $b$ of the exposing-compartment D when the carrier is in its normal position, Fig.

1, or as shown in the drawings Fig. 3, and especially when films are used the strip terminates in a bifurcated or yoke-shaped portion having a projection $i$ at each terminal to support the film-holder near the ends, instead of at the center only, thereby avoiding any danger of distorting the same. A light-guard $g$, consisting of a thin strip of metal, is inserted between the two limbs or portions of the carrier, the same being secured between two channeled strips $g'$, inserted in the back of the camera and secured thereto.

To afford a smooth running of the plates or film-holders, suitable rails, as G G, are placed on the rear wall of the case and extend the entire length of the same, upon which rails the plates or film-holders rest. These rails terminate in the storage-compartment in elevated and inwardly-inclined surfaces H H, which are of such length compared to the plates or film-holders that the action of the spring E will cause the same to tilt at an angle to the rear wall of the case when not supported by the projections $i$ of the carrier F, as best seen in Fig. 2.

The portions of the lifting-surfaces parallel to the back of the case are practically on the same level as the projections $i$, both being of such magnitude that when the plates or film-holders are supported by the two parts they lie approximately parallel to the back wall and a distance from the same equal to or slightly in excess of the thickness of the plates or film-holders.

To shift the position of the carrier, it has secured thereto a stud $j$, which projects through a slotted closing-plate $l$, and is engaged by a nut or knob $j'$, having an internal screw-thread. This knob or nut is adapted to bear upon the closing-plate $l$ when sufficiently turned, and thereby prevents the carrier from being accidentally shifted while the camera is being carried. Under ordinary circumstances the knob or nut is loosened to clear the plate $l$ or bear but lightly upon the same.

Suitable recesses $h'$ and $m$ are formed at opposite ends of the case, into which the hook $h$ and projections $i$ enter, respectively.

In Fig. 1 I have shown the carrier F in its extreme right-hand position and one plate or film-holder already in the storage-compartment C. The plate or film-holder in the receiving-compartment B is within the range of the hook $h$ on the carrier F, while the plate or film-holder in the storage-compartment is supported in a position parallel to the back wall of the case by the surfaces F F and the projections $i\,i$ of the carrier.

The plate or film-holder in the exposing-compartment is locked in position, so far as a lateral movement is concerned, by direct contact with the bottom plate or film-holder in the receiving-compartment and by the projections $i\,i$ of the carrier. It is prevented from falling into the exposing-chamber D by making the portions $o$ of the rails G channel or U shaped in cross-section. If, now, the carrier is shifted toward the left, Fig. 1, the plate or film-holder in the exposing-compartment is pushed back of the plate or film-holder in the storage-compartment by the direct contact of the plate or film-holder merging from the receiving-compartment, and when it reaches the surface H H the forward end thereof is raised until the position shown in Fig. 2 is assumed. The plate or film-holder in the receiving-compartment is transferred at the same time to the exposing-compartment by the hook $h$. The plate or film can be exposed when the parts are in the position now assumed without previously returning the carrier to its normal position, since the plate or film-holder in the exposing-compartment is now locked between the hook $h$ and the bottom plate or film-holder in the storage-compartment. On returning the carrier to its normal position the projections $i$ pass back of the plates or film-holders in the storage-compartment and cause the same to again assume a position parallel to the back wall, as shown in Fig. 1.

It will be noticed from the foregoing description that the plate or film-holder in the exposing-compartment is pushed into the storage-compartment by direct contact with the bottom plate or film-holder in the receiving-compartment, and not by a hook or projection on the carrier engaging the same. Consequently all danger of the device becoming clogged is avoided, and no provision need be made to permit the return stroke of the carrier.

It is evident that the inclined surfaces and spring E' could be so arranged that the plates or film-holders in the storage-compartment would normally be held in the position shown in Fig. 1; but in this case the plate or film-holder in the exposing-compartment would not be locked unless the carrier was returned to its normal position, Fig. 1, after each forward movement.

What I claim as new, and desire to secure by Letters Patent, is—

1. In a three-compartment camera, a storage-compartment for the exposed plates, provided with an inclined surface for lifting the plates and sustaining the outer side of the stack, and a carrier provided at one end with a hook for transferring the plates in the receiving-compartment one by one to the exposing-compartment and at its opposite end with a projection for supporting the inner side of the stack in the storage-compartment, substantially as and for the purpose set forth.

2. In a magazine-camera, a storage-compartment provided with an elevated inclined surface causing the stack in the said compartment to tilt and bring the inner end of the rear plate into the plane of the plate in the exposing-compartment, and a sliding carrier provided with a projection adapted to lift and support the inner side of the stack in the storage-compartment to permit the passage of the plate from the exposing-compartment to the storage-compartment, substantially as described.

3. In a three-compartment camera, guide-rails extending across the back of the camera, provided with channel-shaped portions in the exposing-compartment for supporting the plate in the same, said rails terminating in elevated inclined surfaces in the storage-chamber, substantially as described, and a carrier provided with a hook for transferring the plates and with a projection for supporting one side of the stack in the storage-compartment, substantially as described.

4. In a magazine-camera, the combination of a sliding carrier F, formed of two approximately-parallel parts and provided with means for transferring the plates, a slotted closing-plate $l$, a threaded stud $j$, secured to the carrier and projecting through the slot in the closing-plate, a nut screwed upon the stud and adapted to lock the carrier by contact with the plate, and a light-guard $g$, located between the two parts of the carrier, substantially as described.

5. In a three-compartment camera, a sliding carrier provided with a hook at one end for transferring the plates and an opposite yoke-shaped or bifurcated end provided with projections adapted to lift and support the stack of plates in the storage-compartment, substantially as described.

In testimony that I claim the foregoing as my invention I have signed my name, in presence of two witnesses, this 26th day of January, 1892.

WILLIAM H. BRISTOL.

Witnesses:
KLAS H. FERNSTEDT,
A. FABER DU FAUR.